United States Patent [19]

Purcell

[11] Patent Number: 4,999,462
[45] Date of Patent: Mar. 12, 1991

[54] POSITION DETERMINING AND DIGITIZING METHOD AND DEVICE

[75] Inventor: Alexander M. Purcell, Guilford, Conn.

[73] Assignee: Summagraphics Corporation, Seymour, Conn.

[21] Appl. No.: 417,870

[22] Filed: Oct. 6, 1989

[51] Int. Cl.$^5$ .............................................. G08C 21/00
[52] U.S. Cl. ........................................ 178/19; 340/710
[58] Field of Search ...................... 178/18, 19; 340/710

[56] References Cited

U.S. PATENT DOCUMENTS

| | | | |
|---|---|---|---|
| 4,034,155 | 7/1977 | Muller et al. | 178/19 |
| 4,087,625 | 5/1978 | Dym et al. | 178/19 |
| 4,705,919 | 11/1987 | Dhawan | 178/19 |

Primary Examiner—Stafford D. Schreyer
Attorney, Agent, or Firm—Rosen, Dainow & Jacobs

[57] ABSTRACT

A coordinate determining system, tablet, and method wherein the tablet is formed of a sequence of triangular electrodes extending in a first direction, with alternate electrodes having their apexes extending in opposite directions perpendicular to the first direction, and the bases of alternate electrodes are aligned to define the sides of the tablet. The cursor is round, having a diameter substantially equal to the length of the bases of the electrodes, and is adapted to be electrostatically coupled to the electrodes. Signals are sequentially applied to the electrodes and voltages generated at the cursor are employed to address look up tables for determining the location of the cursor.

15 Claims, 2 Drawing Sheets

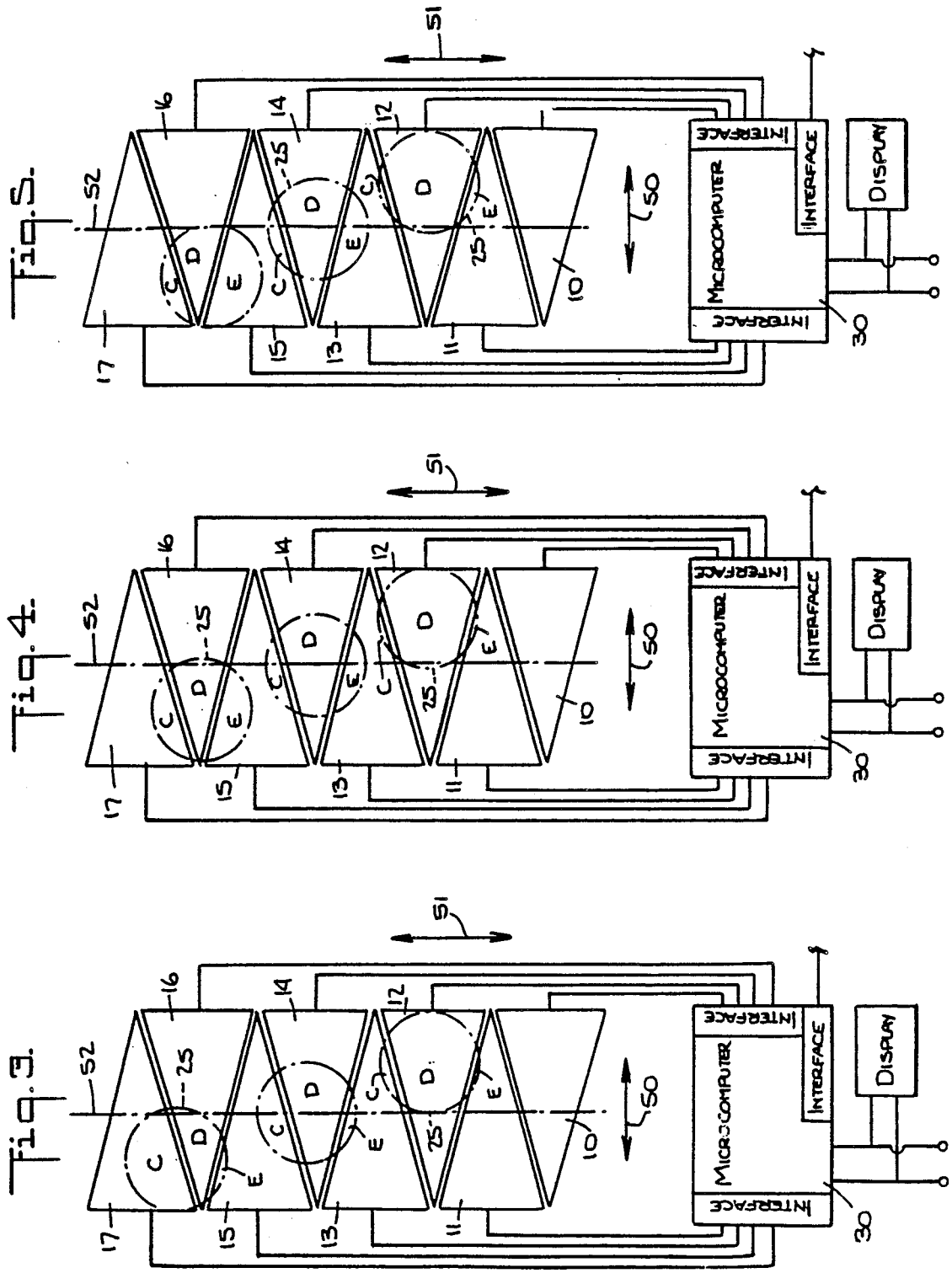

POSITION DETERMINING AND DIGITIZING METHOD AND DEVICE

This invention relates to a device for determining the position of, for example, a cursor on a tablet, and to a method for employing such a device. The invention is more particularly directed to the provision of a digitizing device and method of the type employing an electrostatic pattern coupled digitizer.

BACKGROUND OF THE INVENTION

U.S. Pat. No. 4,705,919, Dhawan, discloses an electrostatic pattern coupled digitizer comprised of a tablet having three coplanar electrodes, including two differently shaped sawtooth configured electrodes and a third electrode covering the remainder of the surface of the tablet. Signals are selectively applied to the electrodes, and the position of a cursor electrostatically coupled thereto is calculated from ratiometric measurements of the signals coupled to the cursor. Alternatively, the signals may be applied to the cursor, with the ratiometric measurements being taken of the signals coupled to the tablet electrodes.

While the above device provides the desired position related output, it requires the use of a relatively complicated precisely shaped electrode pattern.

SUMMARY OF THE INVENTION

Briefly stated the invention is directed to an improved position determining device and method that overcomes the above noted disadvantage of the known device.

Briefly stated, in accordance with the preferred embodiment of the invention, a tablet is formed of a row of substantially coplanar triangular electrodes, i.e. electrode sectors, spaced apart a minimum distance, with alternate electrode sectors being reversed so that the apex of each triangular electrode sector is between, and aligned with, the bases of the next adjacent triangular electrode sectors. In other words, the separation line between the triangular electrode sectors forms a zig-zag line.

The cursor is comprised of a circular disk having a diameter substantially equal to the length of the bases of the triangular electrode sectors. A voltage is applied to the disk, and the triangular electrode sectors are scanned or otherwise sensed in order to obtain voltages therefrom resulting from the voltage on the cursor. (Alternatively, voltages may be sequentially applied to the triangular electrode sectors, with the voltage produced thereby on the cursor being sensed.)

In this arrangement, the cursor can only be positioned to cover parts of either two or three adjacent electrodes, and the ratios of the signals sensed from adjacent and/or alternate electrodes can uniquely define the position of the cursor. The position determining arrangement can employ look up tables of minimum size, and hence employing a minimum of memory, since the table need only store data concerned with one set of two and three sequential electrodes, and the data need only relate to one lateral half of these electrodes in view of the symmetry of the structure.

Briefly stated, in accordance with the invention, a tablet for a coordinate positioning device comprises a plurality of substantially identically shaped first coplanar electrodes and a plurality of second electrodes coplanar with the first electrodes and shaped substantially identically to the first electrodes. The first electrodes are sequentially arranged in a row extending in a first direction and intermeshed with and insulated from the second electrodes. The first and second electrodes have dimensions in the first direction that continually diminish in opposite directions perpendicular to the first direction. The electrodes are preferably isosceles triangle shaped with bases of the first electrodes defining one side of the tablet and bases of the second electrodes defining the opposite side of the tablet.

The system of the invention further comprises a cursor adapted to be moved parallel to and adjacent the tablet and insulated therefrom. The cursor is round and has a diameter substantially equal to the bases of the triangles.

A signal source sequentially applies signals to the electrodes, means for sensing signals generated from the cursor, and means are provided responsive to signals from the cursor for determining coordinate positions of the cursor. The absolute values of the signals, or the ratios of the signals, are employed to address look up tables for determining the location of the cursor.

In a method in accordance with the invention, the cursor is positioned to be electrostatically coupled to the spaced electrodes of the tablet, and signals are sequentially applied to the electrodes while sensing the voltages electrostatically coupled to the cursor. The sensed voltages may be normalized by adjusting them proportionally so that their sum is equal to a constant amount, for addressing a lookup table with the absolute value of the adjusted voltage. Alternatively, the ratios of the sensed voltages may be employed to address look up tables for determining the coordinates.

In accordance with a further method in accordance with the invention, a determination is made of whether voltages above a predetermined threshold have been derived from two or three adjacent electrodes, a first lookup table is addressed with a function of the voltages when such voltages have been derived from two adjacent electrodes, and a second lookup table is addressed with a function of the voltages when such voltages have been derived from three of the electrodes.

BRIEF FIGURE DESCRIPTION

In order that the invention may be more clearly understood, it will now be disclosed in greater detail with reference to the accompanying drawings, wherein;

FIG. 3, 4 and 5 are diagrams illustration various positions of the cursor when voltages are derived from three electrodes.

DETAILED DISCLOSURE OF THE INVENTION

Figure 1:
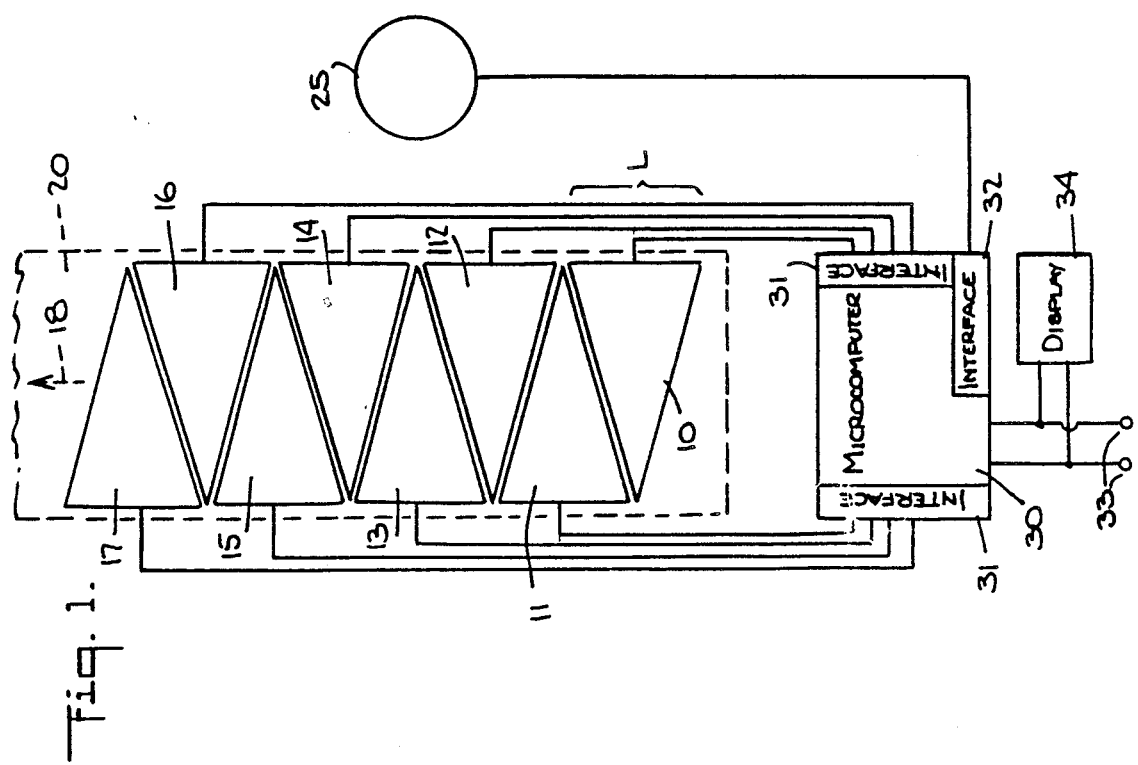
FIG. 1 is a circuit diagram of a position determining system in accordance with the invention.

Referring now to FIG. 1, a plurality of coplanar sequentially positioned substantially identically shaped electrodes 10, 11, 12, 13, 14, 15, 16, 17 are provided on an insulating tablet 20. The electrodes are triangular, with the bases of the electrodes 10, 12, 14 and 16 being colinear and extending along the right side of the tablet, and the bases of the electrodes 11, 13, 15 and 17 being colinear and extending along the left side of the tablet, as illustrated. The sequentially positioned electrodes are adjacent one another so that a minimum distance is provided therebetween. Since the electrodes are of the same shape, the lengths L of their bases are the same. It is of course apparent that additional identical electrodes may be provided on the tablet, for example in the direction indicated by the arrow 18, or that a lesser number of electrodes may be employed.

The system of the invention further includes a cursor 25 in the form of a preferably circular electrode of a diameter substantially equal the length L of the bases. The cursor is adapted to be manually moved across the table, and is insulated from the electrodes 10-17 by conventional techniques, so as to be selectively electrostatically coupled to the electrodes 10-17. In view of the size of the cursor it is apparent that, depending upon its position, it can be coupled to either two or three adjacent ones of the electrodes 10-17.

The electrodes 10-17 are separately coupled to a microcomputer 30 via interfaces 31, and the cursor 25 is coupled to the microcomputer via an interface 32. An output port of the microcomputer may be connected to output terminals 33 for outputting digital signals corresponding to the coordinates of the cursor on the tablet, and these signals may also be applied to a display for the remote or local display of the cursor position.

In one embodiment of the invention, signals such as an alternating or pulsatory voltage may be sequentially applied from the interface to the electrodes 10-17, the voltages being referenced to a system ground. The signals resulting therefrom that are electrostatically coupled to the cursor are analyzed by the microcomputer, as will be discussed, to generate the position indicating output signals.

It is apparent that the signals, such as an alternating or pulsatory voltage, may alternatively be applied to the cursor, with the voltages coupled therefrom to the electrodes 1-17 being sequentially scanned for providing the necessary computation data to the microcomputer.

Figure 2:
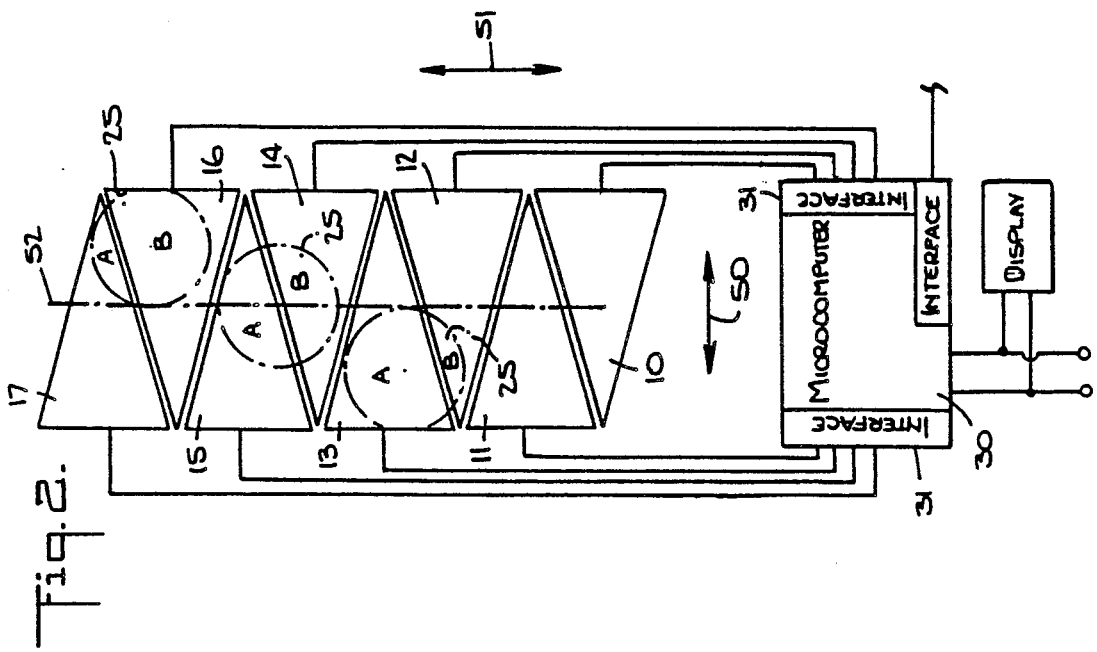
FIG. 2 is a diagram illustration various positions of the cursor when voltages are derived from only two electrodes.

FIG. 2 illustrates the three possible positions of the cursor 25 when the cursor covers parts of only two electrode sectors. In this figure, the portion of the area of the cursor covering an odd numbered electrode 11, 13, 15, 17 is labelled A, and the portion of the area of the cursor covering an even numbered adjacent electrode 10, 12, 14, 16 is labelled B. Since these areas correspond to the respective electrostatic coupling to the adjacent electrode, they also represent the output signal or voltage from the cursor resulting from such coupling.

If the cursor is positioned so that it covers only two adjacent triangular electrode sectors, then only three possible general output conditions may be obtained, i.e.:

A > B

A = B

A < B

The ratio of the voltages A and B is unique for each position of the cursor in the transverse direction of the row i.e. in the direction of the double arrow 50 (hereinafter referred to as the Y direction), so that, for example by employing a look-up table in the memory of the microcomputer, when the program of the microcomputer has determined that only two electrode sectors are covered by the cursor, the position of the cursor in the Y direction of the row is determinable. In view of the symmetry of the sectors, it is only necessary to provide a look up table corresponding to a single pair of adjacent electrode sectors covering ½ of the tablet, in the Y direction, referencing the value obtained in the table to a predetermined datum line in dependence upon whether the quantity A or the quantity B is greater. For example, either the center line 52 of the tablet in the Y direction or the common lines of the bases of the triangular electrodes may be employed as datum lines. If A=B, then the Y position is at the center of the tablet, in the Y direction.

It is also apparent that, when the cursor covers only parts of two adjacent electrodes, as in FIG. 2, ratios of the sensed voltages are unique longitudinally of the row in the direction of the double arrow 51 (hereinafter referred to as the X direction). Accordingly, when voltages are sensed only from two adjacent triangular electrode sectors, the X coordinate of the center of the cursor can also be determined by the ratios of the sensed voltages from the two electrode sectors, preferably by the use of another look up table. It is only necessary for this look up table to provide data with respect to a single pair of adjacent electrodes, on one side of the centerline 52. The X direction datum employed for use of this table may be the X value of the corner of the base of one of the triangular electrodes, depending upon the ratio of A and B and the sequential order in which these voltages were received. Since the electrodes are sequentially scanned, the region of the location of the cursor is localized by ascertaining the time of receipt of the signals from the cursor.

In a scanning sequence useful for the above discussed condition, the odd numbered sectors 11, 13, 15, 17 be scanned first followed by the sequential scan of the even numbered electrodes. In this technique, if the signals are standardized by adjusting their values proportionately so that the sum of A and B equal to a constant, the X and Y positions may be obtained from table based on the absolute values of the detected signal.

Thus, when the voltages are detected reflecting that the cursor covers only two electrodes, instead of employing ratios of voltages sensed at the different electrode sectors, the voltages may be normalized to have a sum equal to a constant value, the coordinates being obtained by comparing the absolute values of the voltages with values in comparison tables.

FIGS. 3-5 illustrate the various positions that the cursor may occupy if it covers parts of three adjacent electrodes. In these figures, the areas (and hence coupled voltages) are indicated as C for the upper area, D for the central area and E for the lower area. FIG. 3 illustrates the various positions of the cursor when C > E, FIG. 4 illustrates the various positions of the cursor when C = E, and FIG. 5 illustrates the various positions of the cursor when C < E.

If the voltages C and E are equal, as illustrated in FIG. 4, it is apparent that the cursor must be centered on the central electrode sector from which the voltage D was sensed, thereby determining that the X coordinate is located at the center of the central electrode D in the X direction. In this case, the Y coordinate can be determined by the ratio of C+E to D, or by the absolute value of either D if the voltages have been normalized so that C+D+E is equal to a constant.

If C and E are not equal, then it is apparent that the X coordinate is a function of the difference between the voltages C and E, with the voltage C+D+E being normalized, the direction of the displacement with respect to the central axis of the D electrode sector being determined by whether C is larger than E, as in FIG. 3, or E is larger than C, as in FIG. 5. In this case, the X coordinate is a function of the ratio of the C and E components and the Y coordinate is a function of absolute value of the sum of the voltages C and E voltages. The datum that is employed in the use of the look up table is determined by whether C is greater or less than E, and the electrode determined by scanning to be the D electrode.

In order to determine the coordinates of the cursor, in the arrangement of the invention, signals such as alternating or pulsatory voltages are applied sequentially to the electrodes, and the magnitudes and time of occurrence of voltages responsive thereto developed in the cursor are detected. Alternatively, of course, the signals may be applied to the cursor and sequentially sensed at the electrodes.

In one method, a determination may first be made if voltages above a predetermined threshold are derived from two or three electrodes, in order to simplify the processing of the voltages. It is preferably that the voltages be adjusted proportionally so that their sum is equal to a constant value. If the voltages are derived from only two electrodes, and the voltages have been normalized, then the absolute values of the voltages may be employed to address a look up table, Alternatively, the ratios of the voltages may be employed in addressing a look up table. In view of the symmetry of the structure, the look up table need only contain data corresponding to a portion of the tablet.

If voltages above the predetermined threshold have been derived from three electrodes, then it is also preferred that the voltages be normalized. In this instance, the differences and sums of the voltages derived from the outermost electrodes may be employed to address a look up table to determine the two coordinates.

While the invention has been disclosed and described with reference to a single embodiment, it will be apparent that variations and modification may be made therein, and it is therefore intended in the following claims to cover each such variation and modification as falls within the true spirit and scope of the invention.

What is claimed is:

1. A tablet for a coordinate positioning device comprising a plurality of substantially identically shaped first coplanar electrodes and a plurality of second electrodes coplanar with said first electrodes and shaped substantially identically to said first electrodes, said first electrodes being sequentially arranged in a row extending in a first direction and intermeshed with and insulated from said second electrodes, said first and second electrodes having dimensions in said first direction that continually diminish in opposite directions perpendicular to said first direction, and means for separately coupling each of said electrodes independently to a device.

2. The tablet of claim 1 wherein said electrodes are triangular with bases of said first electrodes defining one side of said tablet and bases of said second electrodes defining the opposite side of said tablet.

3. The tablet of claim 2 wherein said electrodes are isosceles triangular shaped, with the bases thereof extending in said first direction.

4. A coordinate position determining system comprising a tablet and a cursor;
said tablet comprising a plurality of substantially identically shaped first coplanar electrodes and a plurality of second electrodes coplanar with said first electrodes and shaped substantially identically to said first electrodes, said first electrodes being sequentially arranged in a row extending in a first direction and intermeshed with and insulated from said second electrodes, said first and second electrodes having dimensions in said first direction that continually diminish in opposite directions perpendicular to said first direction;
said cursor being adapted to be moved parallel to and adjacent said tablet and insulated therefrom, said cursor having a round electrode of a diameter whereby said cursor electrode cannot overlie only one electrode and cannot overlie more than three electrodes at any position thereof.

5. The system of claim 4 wherein said electrodes are triangular with bases extending in said first direction, and wherein the diameter of said cursor is substantially equal to the length of said bases.

6. The system of claim 5 wherein said electrodes are isosceles triangle shaped.

7. The system of claim 4 further comprising a source of signals, means for sequentially applying said signals to said electrodes, means for sensing signals generated from said cursor, and means responsive to signals from said cursor for determining coordinate positions of said cursor.

8. The system of claim 7 wherein said means for determining coordinate positions comprises means for addressing a look up table with the absolute value of said signals.

9. The system of claim 7 wherein said means for determining coordinate positions comprises means for addressing a look up table with the ratios of the amplitudes of said signals.

10. The system of claim 4 further comprising a source of signals, means for applying said signals to said cursor, means for sequentially sensing signals generated from said electrodes, and means responsive to signals from said electrodes for determining coordinate positions of said cursor.

11. A method for determining the coordinates of a cursor positioned to be electrostatically coupled to the spaced electrodes of a tablet comprises of a sequence of triangular electrodes extending in a first direction, comprising sequentially applying signals to each said electrode independently of the other electrodes while sensing voltages above a predetermined threshold which are electrostatically coupled to an electrode of said cursor, normalizing said voltages by adjusting their magnitudes proportionally so that the sum of their magnitudes is equal to a constant amount, and addressing a lookup table with said adjusted magnitudes to determine said coordinates.

12. A method for determining the coordinates of a cursor positioned to be electrostatically coupled to the spaced electrodes of a tablet comprised of a sequence of triangular electrodes extending in a first direction, comprising sequentially applying signals to said electrodes while sensing voltages above a predetermined threshold which are electrostatically coupled to an electrode of said cursor, determining whether said voltages have been derived from two or three adjacent electrodes, addressing a first lookup table with a function of said voltages when said voltages have been derived from two adjacent electrodes, and addressing a second lookup table with a function of said voltages when said voltages have been derived from three of said electrodes.

13. The tablet of claim 1, wherein said device is a signal source.

14. The tablet of claim 1, wherein said device is a signal processor.

15. A method for determining the coordinates of a cursor positioned to be electrostatically coupled to the spaced electrodes of a tablet comprised of a sequence of triangular electrodes extending in a first direction, comprising applying signals to an electrode of the cursor, selectively sensing signals above a predetermined threshold electrostatically coupled to any of said electrodes from said cursor electrode independently of voltages electrostatically coupled to respective adjacent electrodes, normalizing said sensed voltages by adjusting their magnitudes proportionally so that the sum of their magnitudes is equal to a constant amount, and addressing a lookup table with said magnitudes to determine said coordinates.

* * * * *